(12) United States Patent
Yu et al.

(10) Patent No.: US 10,616,942 B2
(45) Date of Patent: Apr. 7, 2020

(54) INFORMATION TRANSMISSION METHOD, APPARATUS, AND SYSTEM FOR COVERAGE CLASS OF TERMINAL

(71) Applicant: HUAWEI TECHNOLOGIES CO., LTD., Shenzhen, Guangdong (CN)

(72) Inventors: Yinghui Yu, Beijing (CN); Chenwan Li, Beijing (CN); Yan Wang, Beijing (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 1 day.

(21) Appl. No.: 15/971,353

(22) Filed: May 4, 2018

(65) Prior Publication Data
US 2018/0255597 A1  Sep. 6, 2018

Related U.S. Application Data

(63) Continuation of application No. PCT/CN2015/094057, filed on Nov. 6, 2015.

(51) Int. Cl.
*H04W 76/14* (2018.01)
*H04W 16/18* (2009.01)
(Continued)

(52) U.S. Cl.
CPC ............. *H04W 76/14* (2018.02); *H04L 69/22* (2013.01); *H04W 4/70* (2018.02); *H04W 8/02* (2013.01);
(Continued)

(58) Field of Classification Search
CPC ..... H04W 76/14; H04W 76/27; H04W 76/30; H04W 68/005; H04W 74/08; H04W 8/02;
(Continued)

(56) References Cited

U.S. PATENT DOCUMENTS 8,019,576 B2   9/2011 Luss
9,674,710 B2 * 6/2017 Chen .................... H04W 16/18
(Continued)

FOREIGN PATENT DOCUMENTS

CN   1770902 A    5/2006
CN   104811262 A  7/2015
(Continued)

OTHER PUBLICATIONS

"3$^{rd}$ Generation Partnership Project; technical Specification Group GSM/EDGE Radio Access Network; Radio subsystem link control (Release 12)," 3GPP TS 45.008, V12.4.0, Nov. 2014, 153 pgs.
(Continued)

*Primary Examiner* — Warner Wong
(74) *Attorney, Agent, or Firm* — Womble Bond Dickinson (US) LLP

(57) ABSTRACT

A method to transmit information includes: obtaining, by a terminal in a disconnected state, information about a current coverage class of the terminal; and sending, by the terminal, a first message to an access network device, where the first message carries information about a coverage class of the terminal. The terminal in the disconnected state actively reports the information about the coverage class, so that a network device learns of the information about the coverage class of the terminal in a timely manner. In this way, during communication, a communication limitation or communication resource waste caused by inconsistency between information about a coverage class of the terminal that is stored on a network side and information about an actual coverage class can be avoided, and network resources can be fully used.

14 Claims, 7 Drawing Sheets

(51) Int. Cl.
*H04L 29/06* (2006.01)
*H04W 8/24* (2009.01)
*H04W 4/70* (2018.01)
*H04W 76/30* (2018.01)
*H04W 76/27* (2018.01)
*H04W 8/02* (2009.01)
*H04W 74/08* (2009.01)
*H04W 28/16* (2009.01)
*H04W 68/00* (2009.01)

(52) U.S. Cl.
CPC .............. *H04W 8/24* (2013.01); *H04W 16/18* (2013.01); *H04W 74/08* (2013.01); *H04W 76/27* (2018.02); *H04W 76/30* (2018.02); *H04W 28/16* (2013.01); *H04W 68/005* (2013.01)

(58) Field of Classification Search
CPC ..... H04W 16/00; H04W 16/02; H04W 16/18; H04W 28/00; H04W 28/16; H04W 28/18; H04W 28/24; H04W 72/00; H04W 72/02; H04W 72/04; H04W 4/00; H04W 4/02; H04L 41/5022; H04L 41/5025; H04L 2012/5631; H04L 47/76; H04L 47/78; H04L 67/1074; H04L 67/1078; H04L 625/10; H04L 29/06183; H04L 2027/0083
See application file for complete search history.

(56) References Cited

U.S. PATENT DOCUMENTS

| | | | | |
|---|---|---|---|---|
| 10,123,303 | B2* | 11/2018 | Diachina | H04W 68/02 |
| 2007/0218909 | A1 | 9/2007 | Deng et al. | |
| 2015/0103781 | A1 | 4/2015 | Wu | |
| 2015/0223182 | A1* | 8/2015 | Kim | H04W 72/042 370/329 |
| 2016/0198438 | A1* | 7/2016 | Wong | H04L 5/0053 370/329 |
| 2016/0219553 | A1* | 7/2016 | Sundberg | H04L 1/0009 |
| 2016/0227580 | A1* | 8/2016 | Xiong | H04W 76/18 |
| 2016/0262186 | A1* | 9/2016 | Lee | H04W 74/006 |
| 2016/0338005 | A1 | 11/2016 | Lim et al. | |
| 2016/0338008 | A1* | 11/2016 | Xia | H04W 48/10 |
| 2016/0345308 | A1* | 11/2016 | Futaki | H04W 72/048 |
| 2017/0064670 | A1* | 3/2017 | Shen | H04W 68/005 |
| 2017/0099682 | A1* | 4/2017 | Priyanto | H04W 74/0833 |
| 2017/0332349 | A1* | 11/2017 | Sundberg | H04L 1/0009 |
| 2018/0192387 | A1* | 7/2018 | Jung | H04W 48/20 |
| 2018/0270788 | A1* | 9/2018 | Johansson | H04W 68/04 |
| 2018/0295612 | A1* | 10/2018 | Yi | H04B 7/26 |
| 2019/0150116 | A1* | 5/2019 | Johansson | H04W 68/04 |

FOREIGN PATENT DOCUMENTS

| | | |
|---|---|---|
| JP | 2017-507584 A | 3/2017 |
| WO | 2015113817 A1 | 8/2015 |
| WO | 2015116732 A1 | 8/2015 |
| WO | 2015116870 A1 | 8/2015 |

OTHER PUBLICATIONS

"3rd Generation partnership Project; Technical specification Group GSM/EDGE Radio Access Network; Multiplexing and multiple access on the radio path (Release 12)," 3GPP TS 45.002, V12.4.0, Mar. 2015, 119 pgs.

"3rd Generation Partnership Project; Technical Specification Group GSM/EDGE Radio Access Network; Mobile radio interface layer 3 specification; Radio Resource Control (RRC) protocol (Release 12)," 3GPP TS 44.018, V12.6.0, Jun. 2015, 473 pgs.

International Search Report dated Jul. 27, 2016, in corresponding International Patent Application No. PCT/CN2015/094057, 6 pgs.

Written Opinion of the International Search Authority dated Jul. 27, 2016, in corresponding International Patent Application No. PCT/CN2015/094057, 5 pgs.

3GPP TR 45.820 V13.0.0 (Aug. 2015), 3rd Generation Partnership Project; Technical Specification Group GSM/EDGE Radio Access Network; Cellular system support for ultra-low complexity and low throughput Internet of Things (CIoT) (Release 13), pp. 1-495.

Huawei, HiSilicon, NB-IOT—Paging Optimization and Enhancement, 3GPP TSG-RAN WG2 #91BIS R2-154505 [online], Sep. 30, 2015, pp. 1-3.

CATT, Further Considerations on Paging for Coverage Enhancement UEs, 3GPP TSG-RAN WG2 #91 R2-153337 [online], Aug. 14, 2015, pp. 1-4.

Notice of Reasons for Rejection dated Apr. 1, 2019 in corresponding Japanese Patent Application No. 2018-541463, pp. 12-21.

International Search Report, dated Jul. 27, 2016, in International Application No. PCT/CN2015/094057 (4 pp.).

XP051034350 GPC150297 GERAN2, "Reply LS on paging for MTC," 3GPP TSG GERAN2 Adhoc#2 on FS_IoT_LC, Sophia Antipolis, France, Apr. 20-23, 2015, S2-152997, S2-152714, S2-152142, S2-151459 (2 pp.).

Partial Supplementary European Search Report, dated Oct. 9, 2018, in European Application No. 15907673.6 (13 pp.).

S2-152997 GERAN2,"Reply LS on paging for MTC",LS (GPC150250/S2-151383) on paging for MTC,3GPP TSG GERAN2 Adhoc#2 on FS_IoT_LC,Sophia Antipolis, France, Apr. 20-23, 2015,total 2 pages.

* cited by examiner

INFORMATION TRANSMISSION METHOD, APPARATUS, AND SYSTEM FOR COVERAGE CLASS OF TERMINAL

CROSS-REFERENCE TO RELATED APPLICATIONS

This application is a continuation of International Application No. PCT/CN2015/094057, filed on Nov. 6, 2015, the disclosure of which is hereby incorporated by reference in its entirety.

TECHNICAL FIELD

The present disclosure relates to wireless communications technologies, and in particular, to an information transmission method, an apparatus, and a system.

BACKGROUND

As the Internet of things becomes an important part of wireless communications technologies, a market requirement for the Internet of things increases rapidly. The Internet of things includes a large quantity of terminals, and the terminals have different path losses and penetration losses due to different positions of the terminals. Therefore, a protocol related to the Internet of things supports a plurality of coverage classes for being applicable to different terminals. A network side configures resource information for a terminal according to a coverage class of the terminal, so that a network can page the terminal, and data transmission is implemented between the network and the terminal.

In the prior art, there is no dedicated procedure for supporting a coverage class report of a terminal in a disconnected state such as an idle state. In this case, a limitation on communication between the terminal and a network or communication resource waste is caused.

SUMMARY

Embodiments of the present invention provide an information transmission method, an apparatus, and a system, so that network resources can be fully and efficiently used, and a limitation on communication between a terminal and a network side can be avoided.

According to one aspect, an embodiment of this application provides an information transmission method, including: obtaining, by a terminal in a disconnected state, information about a current coverage class of the terminal; and sending, by the terminal, a first message to an access network device, where the first message carries information about a coverage class of the terminal, and the information about the coverage class of the terminal includes at least one of the following information: information indicating that a coverage class of the terminal changes, or the information about the current coverage class of the terminal.

The access network device may forward the received information about the coverage class of the terminal to a core network device by using a second message, that is, sends, to the core network device, all coverage class information obtained from the terminal. Optionally, the access network device may send only a part of the information to the core network device, for example, send only the information indicating that the coverage class of the terminal changes or only the information about the current coverage class of the terminal to the core network device. The core network device may directly learn, according to the reported information indicating that the coverage class changes, that the current coverage class of the terminal changes, or the core network device may learn, according to inconsistency between the information about the current coverage class of the terminal and information that is about a coverage class and that is stored in the core network device, that the current coverage class of the terminal changes. Optionally, the core network device may store the information about the current coverage class of the terminal for use in subsequent communication.

In this embodiment of the present invention, the terminal in the disconnected state actively reports the information about the coverage class, so that a network device learns of the information about the coverage class of the terminal in a timely manner. In this way, during communication, a communication limitation or communication resource waste caused by inconsistency between information about a coverage class of the terminal that is stored on a network side and information about an actual coverage class can be avoided, and network resources can be fully used.

In a possible design, the information indicating that the coverage class changes may be carried in a cause value field in the first message, or the information about the current coverage class of the terminal is carried in an information element or a field in the first message. In another design, the information about the current coverage class of the terminal may be implicitly indicated by using a bearer resource of the first message.

The information about the current coverage class of the terminal may include one of the following information or a combination thereof: a coverage class report, a transmit power of the access network device, a coverage class, a coverage class index, or a coverage radius.

In a possible design, the terminal periodically responds to paging of the network side, and the terminal sends the first message within a predetermined time that is before the terminal responds to network paging. For example, the terminal sends the first message at a moment in proximity to a moment of responding to the paging. In this case, reported information about the current coverage class is the most accurate.

In a possible design, the first message may be a random access request message, a radio resource control connection setup complete message, or a radio resource control connection resume request message. The second message may be an initial UE message, a UE context release command message, an S1-AP context activate message, or an S1-AP UE context deactivate message.

In a possible design, if the core network device determines, within a predetermined time that is after the core network device receives the information that is about the coverage class of the terminal and that is sent by the access network device, that there is to-be-sent downlink data, the core network device initiates a process of establishing a transmission channel, and delivers the downlink data to the terminal. Because the core network device sends the to-be-sent downlink data within the predetermined time in a timely manner, a procedure of paging the terminal can be omitted, so that the downlink data can be delivered in a timely manner, and the terminal can obtain the downlink data as soon as possible. In addition, a large quantity of signaling overheads in processes in which the terminal is paged after link release and deactivation are first performed, and then the terminal obtains the downlink data by using a random access procedure are avoided, and network resource utilization is optimized.

In a possible design, if the core network device determines, within a predetermined time that is after the core network device receives the information that is about the coverage class of the terminal and that is sent by the access network device, that there is no to-be-sent downlink data, the core network device initiates release or deactivation of a connection between the terminal and a network. The core network device does not need to initiate a process of establishing a transmission channel.

In a possible design, the connection between the terminal and the network may be released in an implicit manner. Each of the terminal, the access network device, and the core network device maintains a timer. Timier duration is set, so that the three timers expire at the same time after the core network device stores the information about the current coverage class of the terminal. When the three timers expire, the terminal, the access network device, and the core network device automatically release a connection between the terminal, the access network device, and the core network device.

In a possible design, when there is to-be-transmitted downlink data, one bit may be added to a Media Access Control (MAC) header of a last sent data packet to indicate that the data packet is the last data packet, so that a data receiving party learns an end time of data transmission.

In a possible design, before the connection between the terminal and the network is released or deactivated, the access network device may send, to the terminal by using a message, a redirection message for assisting the terminal to select a cell to be camped on, so that the terminal can more quickly and properly select the cell on which the terminal needs to camp.

According to another aspect, an embodiment of the present invention provides a terminal, and the terminal has a function of implementing a behavior of the terminal in the foregoing method design. The function may be implemented by using hardware, or may be implemented by executing corresponding software by hardware. The hardware or the software includes one or more modules corresponding to the function. The module may be software and/or hardware.

In a possible design, a structure of the terminal includes a transmitter, a receiver, and a processor. The processor is configured to obtain a current coverage class of the terminal. The transmitter is configured to support the terminal in sending a first message to an access network device, where the first message carries information indicating that a coverage class of the terminal changes.

According to still another aspect, an embodiment of the present invention provides an access network device, and the access network device has a function of implementing a behavior of the access network device in the foregoing method design. The function may be implemented by using hardware, or may be implemented by executing corresponding software by hardware. The hardware or the software includes one or more modules corresponding to the function.

In a possible design, a structure of the access network device includes a processor, a receiver, and a transmitter. The processor is configured to support the access network device in performing a corresponding function in the foregoing method. The transmitter and the receiver are configured to support communication between the access network device and a terminal. The transmitter sends information or an instruction in the foregoing method to the terminal or a core network device. The receiver receives information or an instruction that is in the foregoing method and that is sent by the terminal or the core network device. The access network device may further include a memory. The memory is configured to couple with the processor, and the memory stores a program instruction and data that are necessary for the access network device.

According to yet another aspect, an embodiment of the present invention provides a core network device. The core network device has a function of implementing a behavior of the core network device in the foregoing method design. The function may be implemented by using hardware, or may be implemented by executing corresponding software by hardware. The hardware or the software includes one or more modules corresponding to the function.

In a possible design, a structure of the core network device includes a processor, a receiver, and a transmitter. The receiver is configured to receive information or an instruction sent by an access network device. The processor is configured to: determine, within a preset time that is after the receiver receives a second message, whether there is downlink data to arrive; and when there is downlink data to arrive, initiate setup of a transmission channel; or when there is no downlink data to arrive, initiate a procedure of releasing a connection between the terminal and a network.

According to still yet another aspect, an embodiment of the present invention provides a communications system, and the system includes the access network device and the terminal in the foregoing aspects, or the system includes the access network device and the core network device in the foregoing aspects, or the system includes the access network device, the terminal, and the core network device in the foregoing aspects.

According to a further aspect, an embodiment of the present invention provides a computer storage medium, and the computer storage medium is configured to store a computer software instruction used by the foregoing access network device, and includes a program designed for executing the foregoing aspects.

According to a still further aspect, an embodiment of the present invention provides a computer storage medium, and the computer storage medium is configured to store a computer software instruction used by the foregoing terminal, and includes a program designed for executing the foregoing aspects.

Compared with the prior art, the solutions provided in the present invention can avoid a limitation on communication between the terminal and the network side, and implement full use of network resources.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
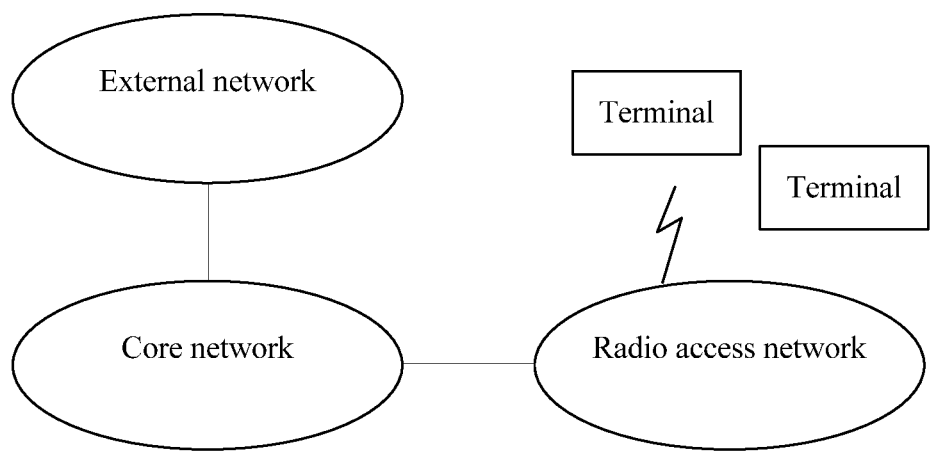
FIG. 1 is a schematic diagram of an application scenario according to an embodiment of the present invention.

FIG. 1 is an application scenario according to an embodiment of the present invention. As shown in FIG. 1, a terminal accesses an external network by using a radio access network (RAN) and a core network (CN). Technologies described in the present invention can be applied to a Long Term Evolution (LTE) system, or other wireless communications systems in which various radio access technologies are used, for example, systems in which access technologies such as Code Division Multiple Access, Frequency Division Multiple Access, Time Division Multiple Access, orthogonal frequency division multiple access, and single carrier frequency division multiple access are used, or a subsequent evolved system such as the 5th Generation 5G system. In addition, the technologies can be further applied to an Internet of Things system. The Internet of Things is the Internet connecting things, and is an important part of new-generation information technologies. The Internet of Things is still based on the Internet, but extends a terminal scope to everything. For example, the terminal may be low power-consuming and low use-frequency machine-to-machine (Machine to Machine, M2M) devices such as a smart meter and a smart water meter. The devices may implement information exchange and communication by using an existing system architecture, or may implement information exchange and communication by using system architectures of the devices.

For clarity, an LTE system is used as an example herein for description. In the LTE system, an evolved UMTS terrestrial radio access network (Evolved Universal Terrestrial Radio Access Network, E-UTRAN) is used as a radio access network, and an evolved packet core (EPC) is used as a core network.

The following describes common nouns in this application.

In this application, nouns "network" and "system" are usually interchangeably used, but a meaning of which may be understood by a person skilled in the art. A terminal in this application may include various handheld devices, in-vehicle devices, wearable devices, or computing devices that have a wireless communication function, or another processing device connected to a wireless modem, and user equipment (UE), a mobile station (MS), terminal equipment, and the like that are in various forms. For ease of description, in this application, the devices mentioned above are collectively referred to as the terminal. An access network device in this application is an apparatus that is disposed in a RAN and that is configured to provide a wireless communication function for a terminal. The access network device may include a macro base station, a micro base station, a relay node, an access point, and the like that are in various forms. In systems in which different radio access technologies are used, a specific name of the access network device may vary. For example, in an LTE network, the access network device is referred to as an evolved NodeB (eNB). In the Cellular Internet of Things (CIoT), the access network device is referred to as a CIoT RAN. A core network device in this application is an apparatus that is disposed in a CN and that is configured to implement functions such as Internet Protocol (IP) address assignment of a terminal, packet filtering, and mobility management. In systems in which different radio access technologies are used, a specific name of the core network device may vary. For example, in an LTE network, the core network device is referred to as a mobility management entity (MME). In a CIoT system, the core network device is referred to as a Cellular Internet of Things serving gateway node (C-SGN).

Figure 2:
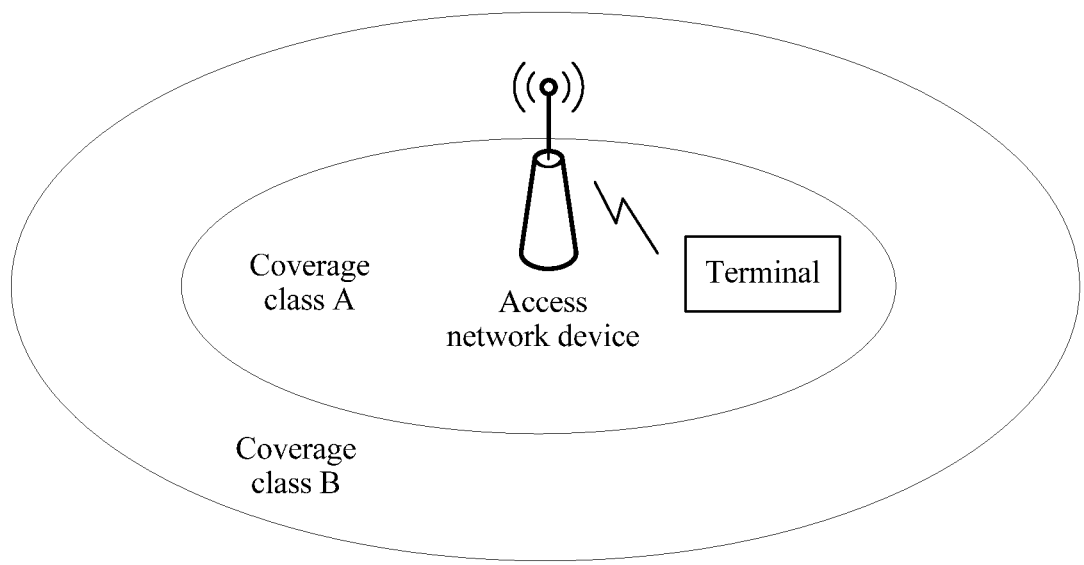
FIG. 2 is a schematic diagram of a coverage class according to an embodiment of the present invention.

A coverage class (CC) may be referred to as a coverage level, a coverage category, or the like, and indicate a path loss and a penetration loss of a terminal in communication. A position of the terminal belongs to a coverage class. For a specific definition of the coverage class, refer to a description in the technical report (TR) 45.820 of the 3rd Generation Partnership Project (3GPP). For example, in FIG. 2, there are two coverage classes: a coverage class A and a coverage class B. For example, a maximum output power of a terminal within a range of the coverage class A is 5 dB, and a maximum output power of a terminal within a range of the coverage class B is 25 dB. It can be learned that, a path loss and a penetration loss in an area of the coverage class A are lower than those in an area of the coverage class B. Therefore, the coverage class A is superior to the coverage class B. Terminals in different coverage classes receive different resource configuration information. A main function of the resource configuration information is to enable the terminal to successfully decode data information sent by a network, so as to facilitate data receiving. Therefore, it is very likely that communication of the terminal is limited if information about an actual coverage class of the terminal is different from information that is about a coverage class of the terminal and that is stored in a core network device.

When a terminal in a connected state releases a connection to a network, a core network device obtains information about a current coverage class of the terminal and stores the information about the coverage class. In subsequent communication, the core network device communicates with the terminal based on the stored information about the coverage class. However, in an actual case, the terminal may be not connected to the network for a period of time, for example, the terminal is in a disconnected state such as an idle state or a suspend state, and a position of the terminal changes during this period of time. As a result, the coverage class of the terminal changes. In this case, the information that is about the coverage class and that is stored in the core network device is inconsistent with information about an actual coverage class of the terminal during next communication. If the coverage class of the terminal is degraded (for example, referring to FIG. 2, the coverage class of the terminal changes from A to B), the terminal cannot correctly receive information sent by the network. If the coverage class of the terminal is upgraded (for example, referring to FIG. 2, the coverage class of the terminal changes from B to A), but an original communication resource is still used, communication resource waste is caused. Therefore, a technical solution is urgently required to resolve the foregoing problems.

Figure 3:
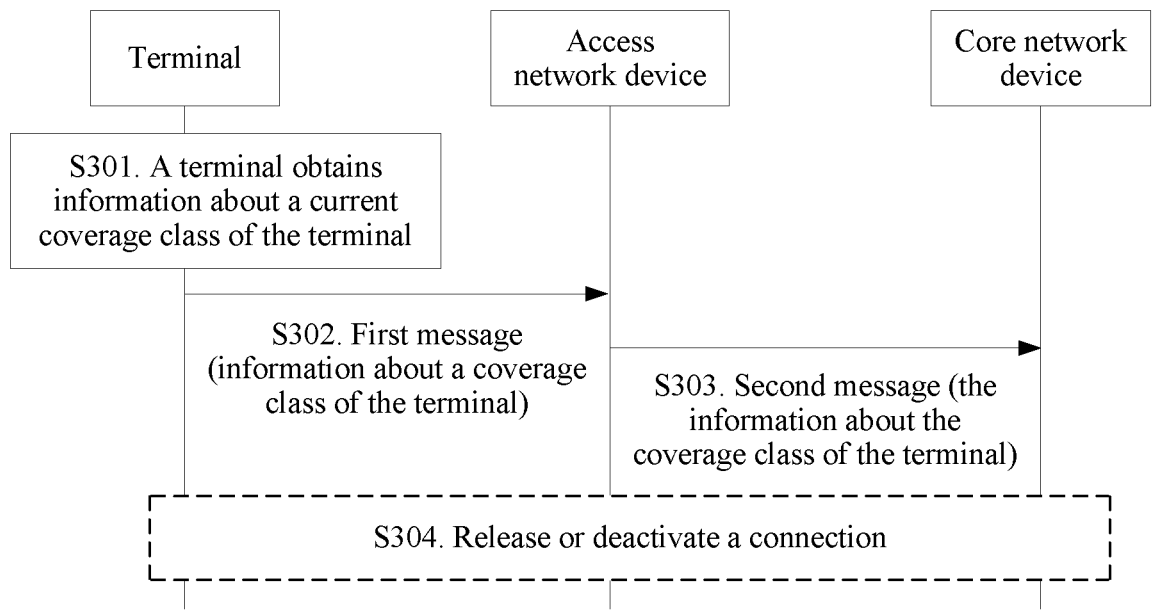
FIG. 3 is a flowchart of an information transmission method according to an embodiment of the present invention.

FIG. 3 is a flowchart of an information sending method according to an embodiment of the present invention. The method may be applied to the system environment shown in FIG. 1, and the method includes the following steps.

S301. A terminal obtains information about a current coverage class of the terminal.

The terminal in a disconnected state such as an idle state or a suspend state may actively measure the current coverage class of the terminal, or receive an indication of an access network device and measure the current coverage class of the terminal, to obtain the information about the current coverage class of the terminal. In an example, a moment of measuring the current coverage class of the terminal may be determined by starting a timer disposed in the terminal. When the timer expires, a measurement program is started. Alternatively, the terminal starts the measurement program immediately when receiving the indication of the access network device. A measurement manner and a measurement method are the same as those in the prior art. Details are not described herein.

S302. The terminal sends a first message to an access network device, where the first message carries information about a coverage class of the terminal, and the information about the coverage class of the terminal includes information indicating that a coverage class of the terminal changes or the information about the current coverage class of the terminal, or includes both the information indicating that the coverage class of the terminal changes and the information about the current coverage class of the terminal.

In an example, the information indicating that the coverage class of the terminal changes may be indication information that is used to indicate that the coverage class of the terminal changes. For example, a cause value information element carried in the first message is used to indicate that the coverage class of the terminal changes. Certainly, the information element may have another name, and this is not limited herein. The access network device learns, by identifying the cause information element, that the coverage class of the terminal changes.

In an example, the information about the current coverage class of the terminal may be carried in the first message, and indicated by using an information element. In another example, the information about the current coverage class of the terminal may be implicitly indicated by using the first message. For example, the terminal and the access network device may pre-agree, by using a protocol, on the information that is about the current coverage class of the terminal and that is corresponding to a time-frequency resource or a code resource used when the terminal sends the first message. In this case, after receiving the first message that is sent on the particular time-frequency domain resource or code resource by the terminal, the access network device may learn of the information about the current coverage class of the terminal according to the protocol.

The information about the current coverage class of the terminal may include one of the following information or a combination thereof: a coverage class report, a transmit power of the access network device, a coverage class, a coverage class index, a coverage radius, or the like.

In an example, the first message may be a random access request message, a radio resource control (RRC) connection setup complete message, an RRC connection resume request message, or the like. For example, the terminal wakes from the idle state, and sends, to the network device, the information indicating that the coverage class of the terminal changes, and the information indicating that the coverage class of the terminal changes may be carried in the random access request message or the RRC connection setup complete message. For another example, the terminal wakes from the suspend state, and sends, to the network device, the information indicating that the coverage class of the terminal changes, and the information indicating that the coverage class of the terminal changes may be carried in the random access request message or the RRC connection resume request message.

In an example, the terminal may wake up at a proximity moment before a network pages the terminal, to send the first message. For example, the proximity moment may be one second, two seconds, or even a shorter time prior to a moment of performing the paging. The terminal may obtain, by means of calculation according to a preset formula by using some related configuration information such as paging density and a discontinuous reception period that are sent on a network side, the moment at which the network pages the terminal. In this case, information that is about a coverage class of the terminal and that is stored by the network at the paging moment is more accurate, and can more accurately indicate an actual coverage class in which the terminal is located at the paging moment.

S303. The access network device receives the first message, and sends a second message to a core network device, where the second message carries the information indicating that the coverage class of the terminal changes, and the information about the coverage class of the terminal may include the information indicating that the coverage class of the terminal changes or the information about the current coverage class of the terminal, or includes both the information indicating that the coverage class of the terminal changes and the information about the current coverage class of the terminal.

For example, after the terminal and the access network device complete sending and receiving of the first message, and the terminal and the access network device establish or resume an air interface connection, the access network device sends the second message to the core network device. The second message is used to indicate, to the core network device, that the current coverage class of the terminal changes, and carries the information indicating that the coverage class of the terminal changes.

In an example, the information indicating that the coverage class changes may be carried in an information element or a field in the second message. For example, the information indicating that the coverage class changes may be carried in an indication information element.

In an example, the information about the coverage class may include one of the following information or any combination thereof: the coverage class report, the transmit power of the access network device, the coverage class, the coverage class index, the coverage radius, or the like.

In an example, the second message may be an initial UE message, an S1-AP UE context active message, or the like.

After receiving the second message, the core network device may learn, in a timely manner, that the current coverage class of the terminal changes.

Optionally, the method may further include: S304. The core network device initiates release or deactivation of a connection between the terminal and a network. The connection between the terminal and the network is released or deactivated in an implicit manner or in an explicit manner.

In an example, when the second message carries the information about the current coverage class of the terminal, the core network device receives the second message, obtains the information about the current coverage class of the terminal, and stores the information about the current coverage class of the terminal. After receiving the second message, the core network device does not need to initiate a procedure of establishing a transmission channel, and may release or deactivate an existing connection between the terminal, the access network device, and the core network device in an implicit manner. The following describes in detail a specific procedure of the implicit manner by using an embodiment for reference. In the implicit manner, during subsequent connection release or deactivation, related information may not need to be exchanged between the terminal, the access network device, and the core network device. An advantage of this manner is that signaling overheads in the network are further reduced.

In another example, after receiving the second message, the core network device may not need to initiate a procedure of establishing a transmission channel, and releases or deactivates an existing connection between the terminal, the access network device, and the core network device in an explicit manner, that is, by using a signaling indication. This manner is the same as that in the prior art. Details are not described herein. It should be noted that, if the second message does not carry the information about the current coverage class of the terminal, the access network device may send a third message to the core network device. The third message carries the information about the current coverage class of the terminal, so that the core network device learns of the information about the current coverage class of the terminal. In an example, the access network device may send the information about the current coverage class of the terminal to the core network device in a connection release process. For example, when the terminal is switched to an idle state, the third message may be a UE context release complete message. When the terminal is switched to a suspend state, the third message may be an S1-AP UE context deactive message. That is, the information about the current coverage class of the terminal is carried in a message in an existing procedure, so that the core network device obtains and stores the information about the current coverage class of the terminal. In an example, the information that is about the current coverage class of the terminal and that is carried in the third message may be included in a coverage enhancement level information element (IE).

According to the technical solution provided in this embodiment of the present invention, the terminal actively reports, to the network side, the information indicating that the coverage class changes, so that the network stores the information indicating that the coverage class changes for subsequent communication. In this way, during communication, a communication limitation or communication resource waste caused by inconsistency between information about a coverage class of the terminal that is stored on the network side and information about an actual coverage class can be avoided, and network resources can be fully used. In addition, because the procedure is specially used to report a coverage class, the related procedure of establishing the transmission channel is omitted, and signaling overheads are greatly reduced.

Figure 4:
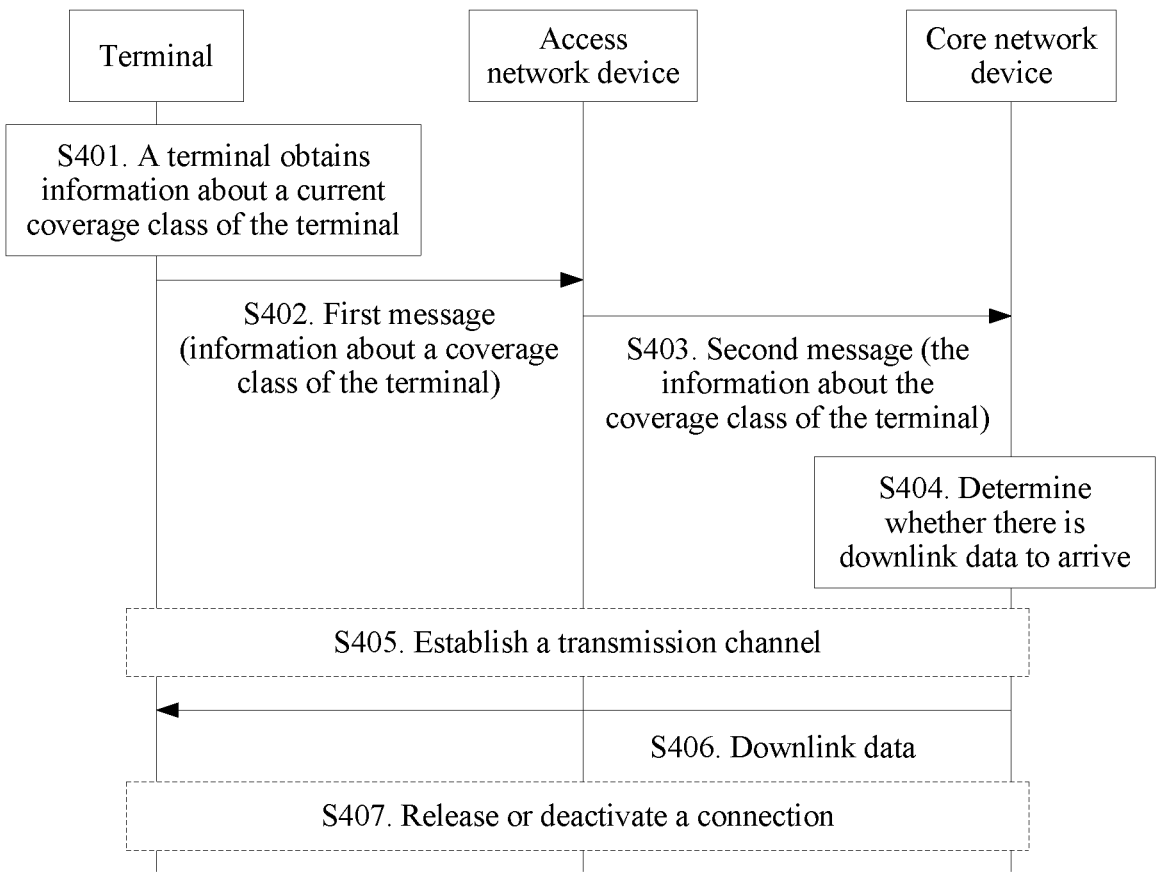
FIG. 4 is a flowchart of another information transmission method according to an embodiment of the present invention.

FIG. 4 is a flowchart of another information sending method according to an embodiment of the present invention. The method may be applied to the system environment shown in FIG. 1. For S401, S402, and S403 in FIG. 4, refer to the related descriptions of S301, S302, and S303 in FIG. 3. Details are not repeatedly described herein.

S404. After receiving the second message sent by the access network device, the core network device determines whether there is to-be-sent downlink data. For example, after receiving the second message sent by the access network device, the core network device may wait for a time window, and determine, in the time window, whether there is downlink data to arrive. If there is downlink data to arrive, the core network device may continue to perform the following steps.

S405. The core network device initiates setup of a transmission channel between the terminal and a network, where the transmission channel may be a data bearer.

When the terminal is in an idle state before sending the first message, S405 may be specifically as follows: The core network device initiates setup of the data bearer between the terminal and the network. When the terminal is in a suspend state before sending the first message, S405 may be specifically as follows: The core network device activates setup of the data bearer between the terminal and the network.

It should be noted that, S405 in this embodiment is optional, because the transmission channel may be a non-access stratum signaling bearer when efficient small data transmission is supported. For example, small data transmission may be performed by using non-access stratum signaling. In this case, the access network device may perform downlink data transmission by directly using an existing non-access stratum signaling channel.

S406. Implement downlink data transmission between the network and the terminal. Specifically, the terminal may receive the downlink data by using the transmission channel.

In this embodiment, when the core network device learns that the coverage class of the terminal changes, if the core network device determines that there is to-be-sent downlink data in a predetermined time window, the core network device first completes a downlink data delivery process, and then releases or deactivates a connection between the terminal and the network. In this way, a procedure of paging the terminal may be omitted, the downlink data can be delivered in a timely manner, and the terminal can obtain the downlink data as soon as possible. In addition, a large quantity of signaling overheads in processes in which the terminal is paged after link release and deactivation are first performed, and then the terminal obtains the downlink data by using a random access procedure are avoided, and network resource utilization is optimized.

Optionally, this embodiment of the present invention may further include S407. For a description of S407, refer to the foregoing description of S304. Details are not repeatedly described.

Figure 5:
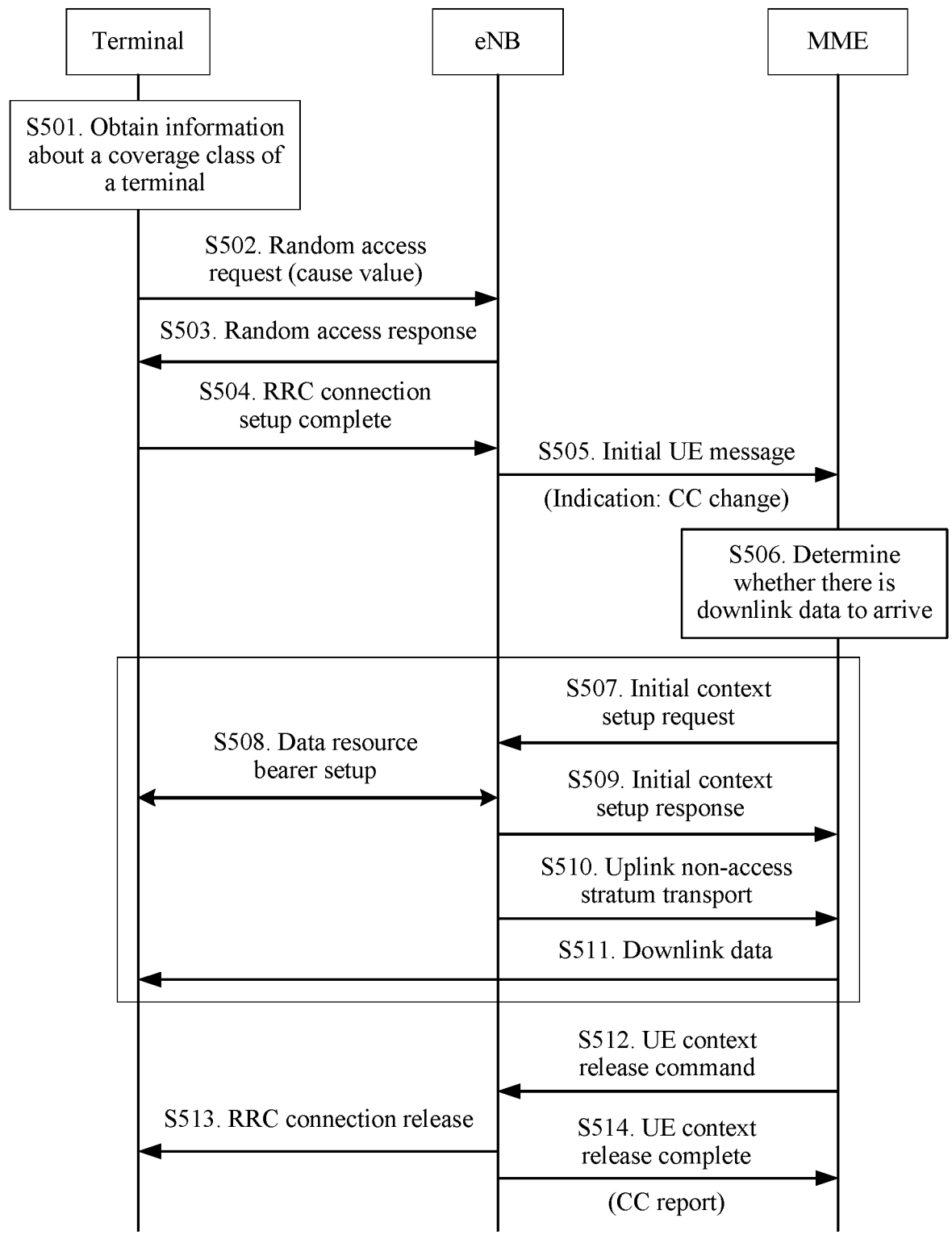
FIG. 5 is a schematic diagram of an information exchange procedure according to an embodiment of the present invention.
Figure 6:
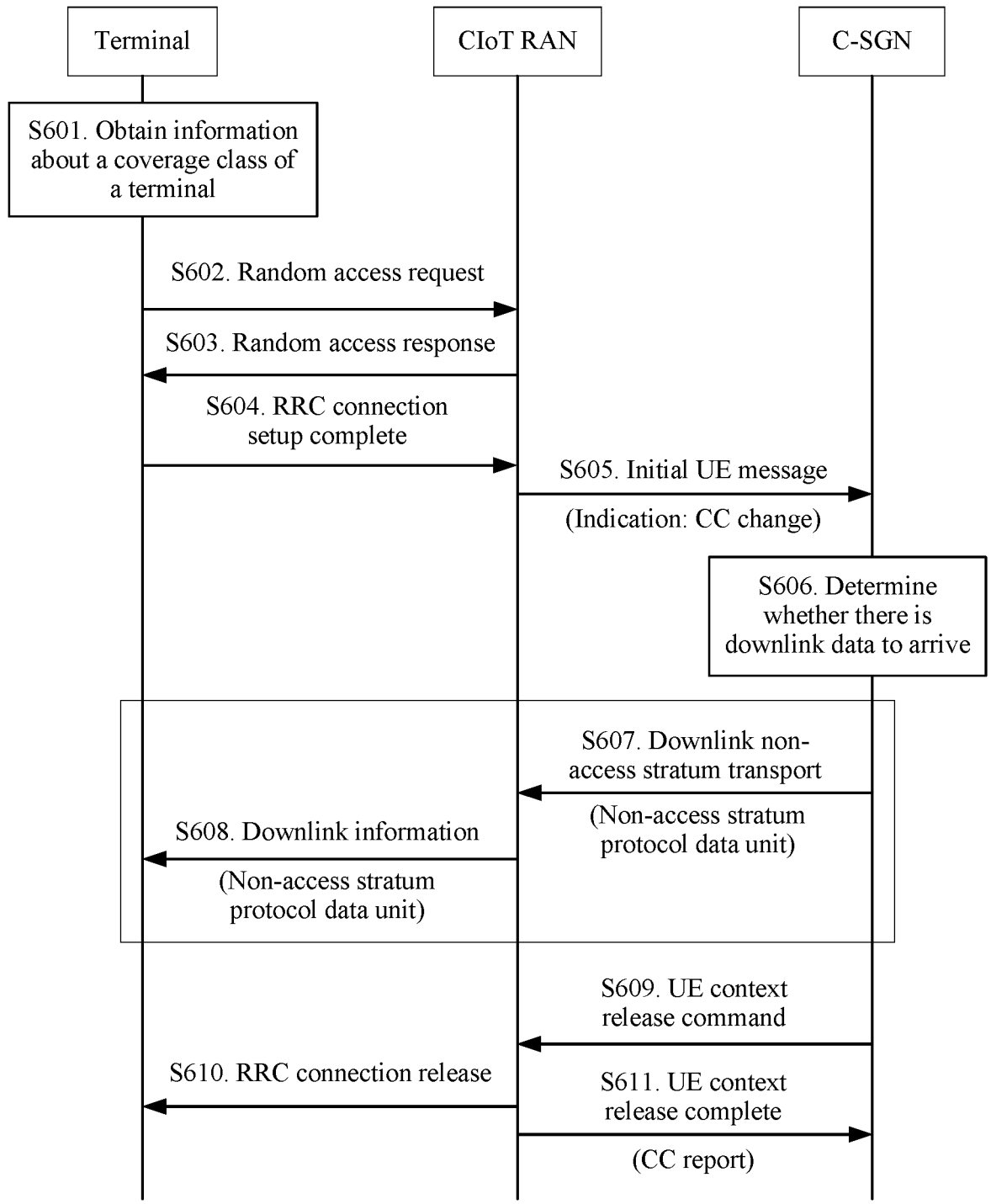
FIG. 6 is a schematic diagram of another information exchange procedure according to an embodiment of the present invention.
Figure 7:
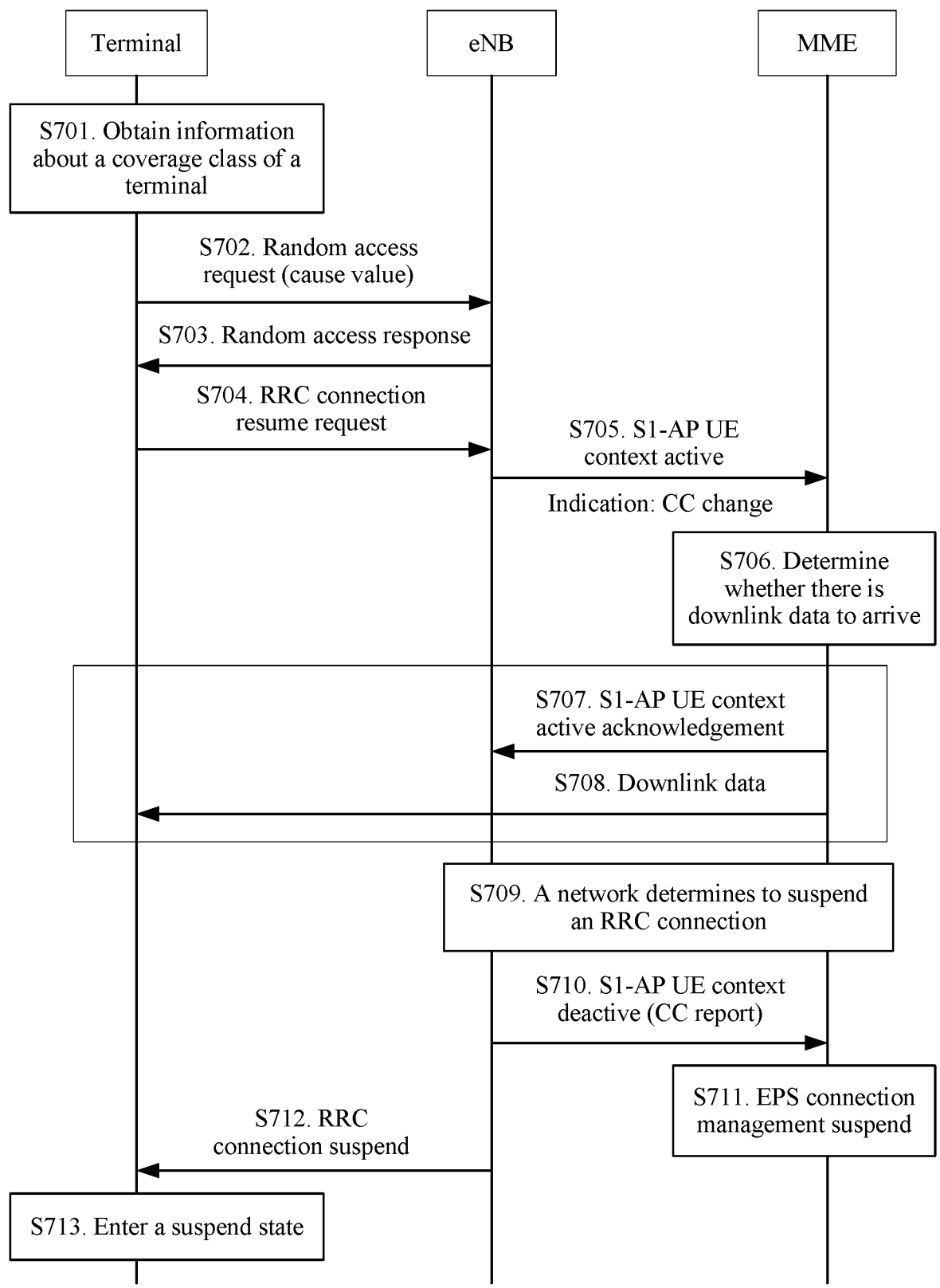
FIG. 7 is a schematic diagram of still another information exchange procedure according to an embodiment of the present invention.

The following further describes the embodiments of the present invention with reference to FIG. 5 to FIG. 7. It may be understood that a message name in a specific procedure is merely an example description. In different network architectures or with technology evolution, the message name may change. A name change does not affect understanding of the specific procedure by a person skilled in the art.

FIG. 5 is a schematic diagram of an information exchange procedure according to an embodiment of the present invention. S501. A terminal measures information about a coverage class of the terminal.

As described in S301, the terminal may spontaneously and actively measure a current coverage class of the terminal, or receive an indication of an access network device and measure the current coverage class of the terminal. For a measurement moment and a measurement manner, refer to the description of S301. The following provides a description by using a terminal in an idle state as an example.

S502. The terminal sends a random access request message to a base station eNB.

A moment of sending the random access request message may be a proximity moment before a network pages the terminal. For example, the proximity moment may be one second, two seconds, or even a shorter time prior to a moment of performing the paging. The terminal may obtain, by means of calculation according to a preset formula by using some related configuration information such as paging density and a discontinuous reception period that are sent on a network side, the moment at which the network pages the terminal.

The random access request message carries the information about the coverage class of the terminal, for example, information indicating that a coverage class changes, and/or information about the current coverage class of the terminal. For details, refer to the description of S302. For example, the information indicating that the coverage class changes is carried in a cause field. The random access request message may further carry information such as a random number and/or a buffer status report (BSR).

Optionally, the information about the coverage class of the terminal may be carried in an RRC connection setup complete message in S504 instead of the random access request message, or may be carried in both the two messages. The present invention sets no limitation thereto.

Optionally, the terminal may indicate the information about the current coverage class of the terminal to the eNB by using a time-frequency resource or a code resource used when the terminal sends the random access request to the eNB; or add both the information about the current coverage class and the foregoing information to the random access request message.

S503. The eNB sends a random access response message to the terminal.

The random access response message may further carry a random number, and/or a cell radio network temporary identifier (C-RNTI) allocated by the eNB to the terminal.

The random access response message may further carry some configuration information of the terminal.

S504. The terminal sends an RRC connection setup complete message to the eNB.

The RRC connection setup complete message may carry a non-access stratum UE identifier (NAS UE ID).

As described in S502, the information about the coverage class of the terminal may be carried in the RRC connection setup complete message. For example, when the terminal performs random access in a preamble manner, the random access request message in this manner is a particular code sequence. Therefore, the random access request message may be not capable of directly carrying the information about the coverage class of the terminal, and the information about the coverage class of the terminal is carried in the RRC connection setup complete message, so that the base station can learn of the coverage class of the terminal in a timely manner.

Certainly, the information about the coverage class of the terminal may be carried in a radio resource control connection setup request (RRC connection setup request) message. This is not limited herein.

S505. The eNB sends an initial UE message to a mobility management entity MME.

The eNB receives the message sent by the terminal in S502 or S504, learns of the information about the coverage class of the terminal, and sends the initial UE message to the MME. The initial UE message carries the information indicating that the coverage class of the terminal changes. For example, the information indicating that the coverage class changes (CC Change) may be carried in an indication field in the initial UE message. The initial UE message may further carry the NAS UE ID. For another example, the information about the current coverage class of the terminal may be carried in the initial UE message. For example, the information about the current coverage class of the terminal may include one of the following information or a combination thereof: a coverage class report, a power, a coverage class, a coverage class index, a coverage radius, or the like. After learning of the information about the current coverage class of the terminal, the MME may learn whether the coverage class of the terminal changes in comparison with a previously stored coverage class.

S506. The MME determines whether there is to-be-sent downlink data.

In this case, after receiving the initial UE message, the MME may wait for a time window. If the MME determines, in the time window, that there is to-be-sent downlink data, the MME performs S507 to S511 in FIG. 5. If the MME determines, in the time window, that there is no to-be-sent downlink data, the MME directly goes to and performs step S512 in FIG. 5. In an example, the MME may monitor the time window by using a preset timer. After receiving the initial UE message, the MME starts the timer. If the MME determines, before the timer expires, that there is to-be-sent downlink data, the MME performs S507 to S511. If there is no to-be-sent downlink data until the timer expires, the MME directly goes to and performs step S512.

S507. The MME sends an initial context setup request message to the eNB.

The initial context setup request message may carry one of the following information or any combination thereof: a non-access stratum service request (NAS Service request), a security context, roaming and access restrictions, UE capability information, a UE S1 interface signaling connection identifier (UE S1 interface signaling connection ID), or core network assistance information (CN assistance information).

S508. The terminal and the eNB complete data resource bearer setup.

The terminal and the eNB complete access stratum security setup and setup of related information such as a signaling resource bearer.

S509. The terminal sends an initial context setup response message to the eNB.

The initial context setup response message may carry information such as an eNB UE signaling connection identifier (eNB UE signaling connection ID) and/or a bearer setup confirm.

S510. The eNB sends an uplink non-access stratum transport (uplink NAS transport) message to the MME.

The uplink NAS transport message may carry non-access stratum service complete (NAS service complete) information.

S511. The MME sends the downlink data to the terminal by using the eNB.

S512. The MME sends a UE context release command message to the eNB.

When the MME learns, by using the indication field carried in the initial UE message sent by the eNB in S505, that the coverage class of the terminal changes, if the MME determines that there is no to-be-sent downlink data in the predetermined time window, the MME may perform S512 and instruct the eNB to release a UE context, and the MME does not need to initiate a procedure of establishing a transmission channel. Alternatively, when the MME determines, in the predetermined time window, that there is to-be-sent downlink data, the MME performs S512 after performing S507 to S511.

S513. The eNB sends a radio resource control connection release (RRC connection release) message to the UE.

Optionally, redirection information for assisting the terminal to select a cell to be camped on is added to the RRC connection release message.

S514. The eNB sends a UE context release complete message to the MME.

It can be learned from the description of S505 that the eNB may send the information about the current coverage class of the terminal to the core network device by using the initial UE message in S505. Optionally, the eNB may add the information about the current coverage class of the terminal to the UE context release complete message. For example, the information about the current coverage class of the terminal may be carried in a coverage enhancement level information element IE.

FIG. 6 is a schematic diagram of another information exchange procedure according to an embodiment of the present invention. A terminal is an idle state during initialization. A Cellular Internet of Things system is used as an example herein.

A specific procedure of implementing this embodiment of the present invention in FIG. 6 is similar to that of implementing the embodiment of the present invention in FIG. 5. For some common descriptions, refer to the description in FIG. 5. An application scenario of FIG. 6 is different from an application scenario of FIG. 5. In FIG. 5, an LTE system is used as an example for description. However, in FIG. 6, the Cellular Internet of Things CIoT is used as an example for description. In FIG. 6, an access network device may be a CIoT RAN, and a core network device may be a Cellular Internet of Things serving gateway node C-SGN.

In the scenario of FIG. 6, efficient and infrequent small data packet transmission can be supported, and downlink data transmission may be performed by using non-access stratum signaling.

For descriptions of S601 to S606, refer to the descriptions of S501 to S506 in FIG. 5. For descriptions of S609 to S611, refer to the descriptions of S512 to S514 in FIG. 5. Details are not repeatedly described herein. S607 and S608 are different from S507 to S511. It may be understood that S607 to S608 are optional steps, and are used as an implementation presented in FIG. 6. The following specifically describes S607 to S608.

S607. The C-SGN sends a downlink non-access stratum transport (downlink NAS transport) message to the CIoT RAN.

The downlink NAS transport message carries a non-access stratum protocol data unit (NAS PDU), that is, downlink data that needs to be transmitted to the terminal. In this step, because a small quantity of data is carried in non-access stratum signaling, a data channel specially for transmitting the small quantity of data does not need to be established. This is convenient and efficient.

S608. The CIoT RAN sends downlink information to the terminal.

The downlink information carries the non-access stratum protocol data unit (NAS protocol data unit (PDU)), so that the terminal obtains the downlink data.

Optionally, in the NAS PDU, redirection information for assisting the terminal to select a cell to be camped on may be carried in an existing information element IE or an added information element IE.

FIG. 7 is a schematic diagram of still another information exchange procedure according to an embodiment of the present invention. Herein, an example in which a terminal is in a suspend state in an LTE system scenario is used for description.

For S701 to S703, refer to the descriptions of S501 to S503.

S704. The terminal sends a radio resource control connection resume request (RRC connection resume request) message to the eNB.

The RRC connection resume request message may include one of the following information or a combination thereof: a resume identifier (Resume ID), an authentication token (Auth token), a bearer index, or an establishment cause.

If random access is performed in a preamble manner in S701, the information indicating that the coverage class of the terminal changes may be carried in the RRC connection resume request message.

S705. The eNB sends an S1-AP UE context active message to an MME.

The S1-AP UE context active message carries the information about the coverage class of the terminal. For the information about the coverage class of the terminal, refer to the related descriptions in FIG. 3, FIG. 4, and FIG. 5. For example, the information indicating that the coverage class of the terminal changes may be carried in an indication field.

S706. The MME determines whether there is to-be-sent downlink data.

S706 is similar to S506. For details, refer to the related description of S506. The MME may wait for a time window, and perform S706 in the time window. When there is downlink data to arrive, the MME performs S707 and S708; otherwise, directly goes to and performs S709.

S707. The MME sends an S1-AP UE context active acknowledgement message to the eNB, where the message may be used to activate a data bearer between the terminal and a network.

S708. The MME sends the downlink data to the terminal by using the eNB.

S709. The network determines to suspend an RRC connection.

Herein, the MME may determine to suspend the RRC connection. For example, the MME sends, to the eNB, a command for suspending the RRC connection, and the eNB performs a procedure of suspending the RRC connection between the terminal and the eNB.

S710. The eNB sends an S1-AP UE context deactive message to the MME.

The S1-AP context deactive message may carry the information about the current coverage class of the terminal. For example, the information about the current coverage class of the terminal may be carried in a coverage enhancement level IE. The information about the current coverage class of the terminal may include one of the following information or a combination thereof: a coverage class report, a transmit power of the access network device, a coverage class, a coverage class index, a coverage radius, or the like.

S711. The MME enters an EPS connection management suspend (ECM-Suspend) state.

S712. The eNB sends an RRC connection suspend message to the terminal, where the RRC connection suspend message may carry a resume identifier (Resume ID).

S713. The terminal enters a suspend state.

Alternatively, if the S1-AP UE context active message sent by the eNB to the MME in S705 further carries the information about the current coverage class of the terminal, S710 and S712 may be omitted, that is, the connection between the terminal and the network may be deactivated in an implicit manner. For a specific form and a specific format of the information, refer to the related description in FIG. 5. The following describes in detail a specific procedure of performing connection deactivation in an implicit manner.

According to the technical solution provided in this embodiment of the present invention, the terminal wakes up at a moment and actively sends the information about the coverage class of the terminal to the access network device, so that the network stores the information about the coverage class of the terminal for subsequent communication. In this way, during communication, a communication limitation or communication resource waste caused by inconsistency between information about a coverage class of the terminal that is stored on a network side and information about an actual coverage class can be avoided, and network resources can be fully used.

A specific operation manner of performing release or deactivation in an implicit manner is described herein.

In this process, each of a terminal, an access network device, and a core network device may set a timer. For example, the terminal sets a timer 1, the access network device sets a timer 2, and the core network device sets a timer 3. Optionally, the access network device first determines timer duration T2 of the access network device, and sends T2 to the terminal in a broadcasting manner or by using a dedicated message, a default configuration, or the like, and sends T2 to the core network device by using a message such as an initial UE message or another S1 uplink message, so that the terminal sets timer duration T1 of the terminal according to T2, and the core network device sets timer duration T3 of the core network device according to T2. The following provides a specific description.

After completing uplink transmission of signaling or data to a network, the terminal needs to release or deactivate a connection between the terminal and the access network device and a connection between the access network device and the core network device in an implicit manner:

It is assumed that transmission duration of receiving, by the terminal, signaling or data sent by the access network device is t1, and duration of processing the data by the terminal is t2 (where both t1 and t2 may be learned of or estimated by the terminal according to a specific communication environment, or because a value of t1 and a value of t2 are very small in reality, the terminal may estimate or even ignore the value of t1 and the value of t2). When uplink transmission of a last data packet is completed, and the terminal receives an acknowledgment message sent by the access network device, the terminal starts the timer 1. The duration T1 of the timer 1 is T2−t1−t2. This is corresponding to a scenario in which the access network device immediately starts the timer with the timer duration T2 after sending the acknowledgment message. When receiving data sent by the access network device, the core network device starts the timer 3. Because a transmission delay between the access network device and the core network device is very short, a timing value of the timer 3 may be equal to T2. Certainly, the timer duration of the timer 3 may be set by considering, according to an actual communication situation, transmission duration of sending the data by the access network device to the core network device. In this case, T3 is slightly shorter than T2. In conclusion, in a process of setting the three timers, it should be ensured that expiration moments of the three timers are the same or approximately the same (or in alignment with each other). When the three timers expire, the connection between the terminal and the access network device and the connection between the access network device and the core network device are automatically released or deactivated without an extra signaling indication.

After completing downlink transmission of signaling or data to the terminal, the core network device needs to release or deactivate a connection between the terminal and the access network device and a connection between the access network device and the core network device in an implicit manner:

Because a transmission delay between the access network device and the core network device is very short, the core network device may start the timer 3 after sending data or signaling to the access network device. A timing value of the timer 3 may be equal to T2. Certainly, the timer duration of the timer 3 may be set by considering, according to an actual communication situation, transmission duration of sending data by the access network device to the core network device. In this case, T3 is slightly longer than T2. The access network device starts the timer 2 with the timer duration T2 after receiving the data sent by the core network device, and sends the data to the terminal. It is assumed that transmission duration of receiving, by the terminal, signaling or the data sent by the access network device is t3, and duration of processing the data by the terminal is t4 (where both t3 and t4 may be learned of or estimated by the terminal according to a specific communication environment, or because a value of t3 and a value of t4 are very small in reality, the terminal may estimate or even ignore the value of t3 and the value of t4). When the terminal receives a last downlink data packet, the terminal starts the timer 1, and the duration T1 of the timer 1 is T2−t3−t4. In conclusion, in a process of setting the three timers, it should be ensured that expiration moments of the three timers are the same or approximately the same. When the three timers expire, the connection between the terminal and the access network device and the connection between the access network device and the core network device are automatically released or deactivated without an extra signaling indication.

Particularly, when small data transmission is performed by using NAS signaling, to support efficient transmission, because each network element cannot learn of a last data packet during current transmission, the network element cannot determine a start time of a related timer. Therefore, if a release function or a deactivation function needs to be implemented in an implicit manner, the last data packet may be indicated. For example, during uplink transmission, when sending a last data packet to the access network device, the terminal adds a one-bit indication to a Media Access Control (MAC) header of the last data packet. Correspondingly, when sending data to the core network device, the access network device may add one bit to NAS signaling or an S1 message to indicate information about the last data packet. During downlink transmission, a last data packet may be indicated in a manner the same as that of the uplink transmission.

It should be noted that, performing release or deactivation in an implicit manner is not limited to the technical solution of the present invention, but may be applied to any scenario in which connection release or deactivation needs to be performed between a terminal and a network.

The foregoing mainly describes the solutions provided in the embodiments of the present invention from a perspective of interaction between network elements. It may be understood that, to implement the foregoing functions, each network element such as a terminal, an access network device, or a core network device includes a corresponding hardware structure and/or software module for performing each function. A person skilled in the art should be easily aware that, the units and algorithm steps in each example described with reference to the embodiments disclosed in this specification may be implemented in a form of hardware or a combination of hardware and computer software in the present invention. Whether a function is implemented by using hardware or implemented in a manner in which computer software drives hardware depends on particular applications and design constraint requirements of the technical solutions. A person skilled in the art may use different methods to implement the described functions for each particular application, but it should not be considered that the implementation goes beyond the scope of the present invention.

Figure 8:
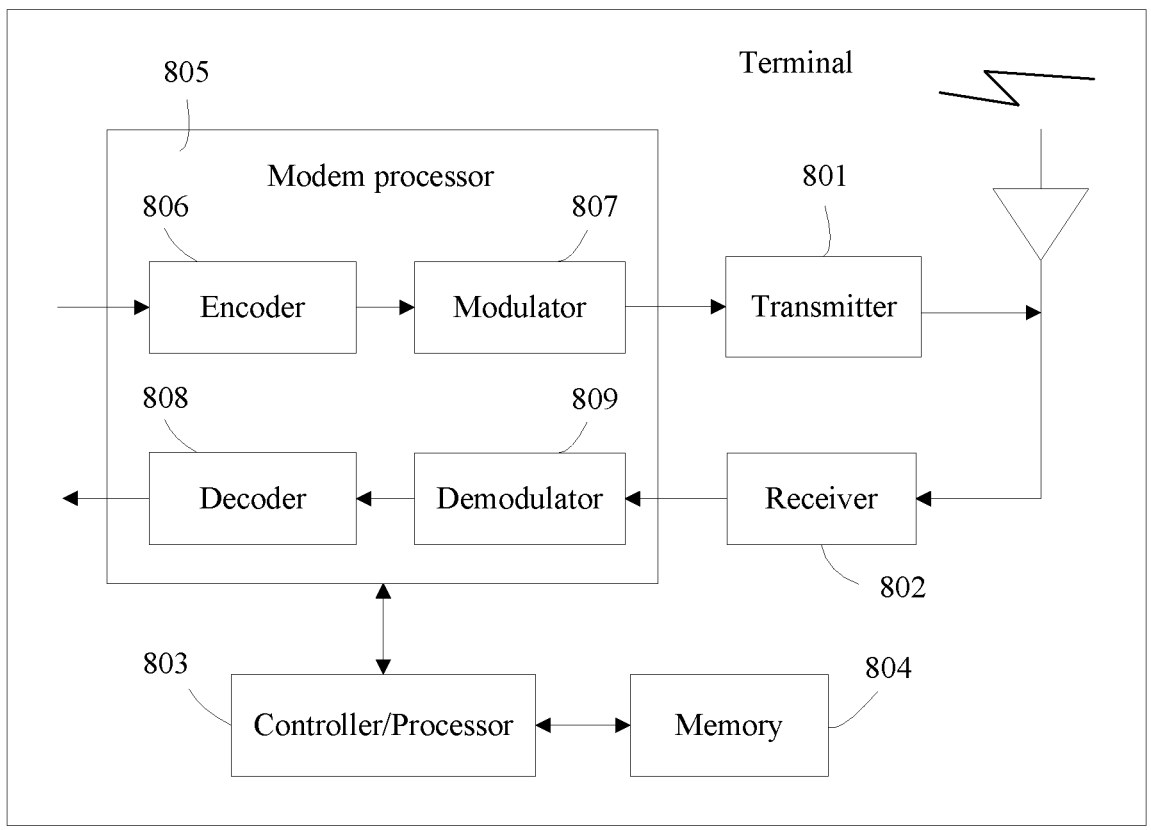
FIG. 8 is a schematic structural diagram of a terminal according to an embodiment of the present invention.

FIG. 8 shows a simplified schematic diagram of a possible design structure of a terminal in the foregoing embodiment. The terminal includes a transmitter 801, a receiver 802, a controller/processor 803, a memory 804, and a modem processor 805.

The transmitter 801 adjusts (such as by means of analog conversion, filtering, amplification, and up-conversion) an output sampling and generates an uplink signal. The uplink signal is transmitted to the access network device in the foregoing embodiment by using an antenna. In a downlink, the antenna receives a downlink signal transmitted by the access network device in the foregoing embodiment. The receiver 802 adjusts (such as by means of filtering, amplification, down-conversion, and digitization) the signal received from the antenna and provides an input sampling. In the modem processor 805, an encoder 806 receives service data and a signaling message that are to be sent on an uplink, and processes (such as by means of formatting, encoding, and interleaving) the service data and the signaling message. A modulator 807 further processes (such as by means of symbol mapping and modulation) encoded service data and an encoded signaling message, and provides the output sampling. A demodulator 809 processes (such as by means of demodulation) the input sampling and provides symbol estimation. A decoder 808 processes (such as by means of de-interleaving and decoding) the symbol estimation and provides decoded data and a decoded signaling message that are sent to the terminal. The encoder 806, the modulator 807, the demodulator 809, and the decoder 808 may be implemented by the composite modem processor 805. These units perform processing according to a radio access technology (such as an access technology of LTE or another evolved system) used in a radio access network.

The controller/processor 803 controls and manages an action of the terminal, is configured to perform processing performed by the terminal in the foregoing embodiment, and controls the transmitter 801 and the receiver 802 to complete actions performed by the terminal in FIG. 3 to FIG. 7. The memory 804 is configured to store program code and data for the terminal.

Figure 9:
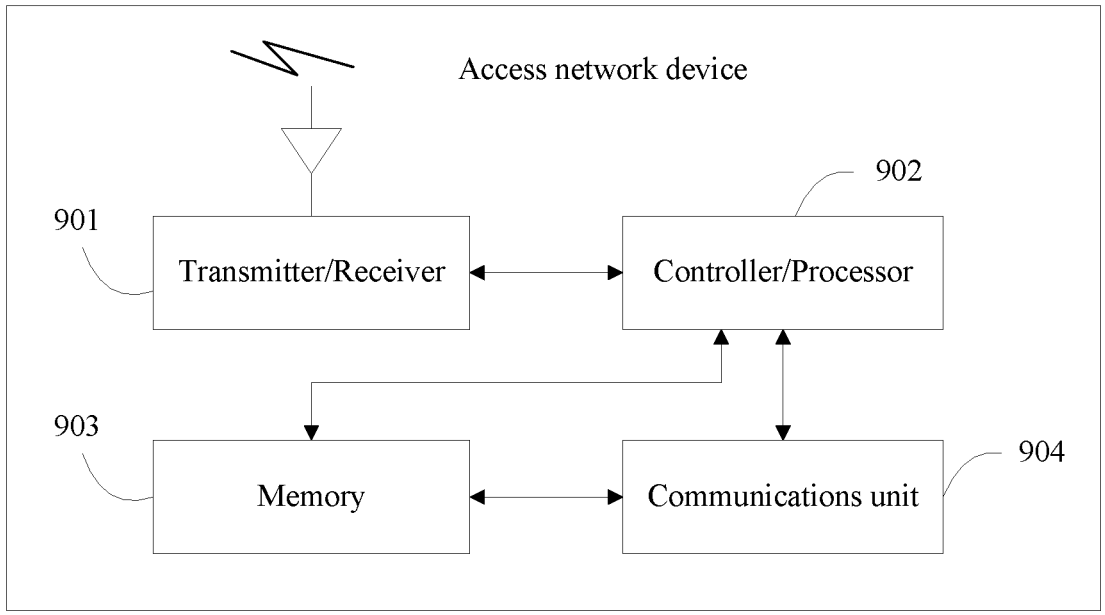
FIG. 9 is a schematic structural diagram of an access network device according to an embodiment of the present invention.

FIG. 9 shows a schematic diagram of a possible structure of an access network device in the foregoing embodiment.

The access network device includes a transmitter/receiver 901, a controller/processor 902, a memory 903, and a communications unit 904. The transmitter/receiver 901 is configured to support the access network device in receiving information from and sending information to the terminal in the foregoing embodiment, and support the access network device in performing wireless communication with another terminal. The controller/processor 902 performs various functions for communicating with the terminal. In an uplink, an uplink signal from the terminal is received by an antenna, demodulated by the receiver 901, and further processed by the controller/processor 902, so as to restore service data and signaling information that are sent by the terminal. In a downlink, service data and a signaling message are processed by the controller/processor 902 and demodulated by the transmitter 901, so as to generate a downlink signal, and the downlink signal is transmitted to the terminal by using the antenna. The controller/processor 902 further performs a processing process of the access network device in FIG. 3 to FIG. 7 and/or is configured to perform another process of the technology described in this application. The memory 903 is configured to store program code and data of the access network device. The communications unit 904 is configured to support the access network device in communicating with another network device.

It may be understood that FIG. 9 shows only a simplified design of the access network device. In actual application, the access network device may include any quantity of transmitters, receivers, processors, controllers, memories, communications units, and the like, and all access network devices that can implement the present invention fall within the protection scope of the present invention.

Figure 10:
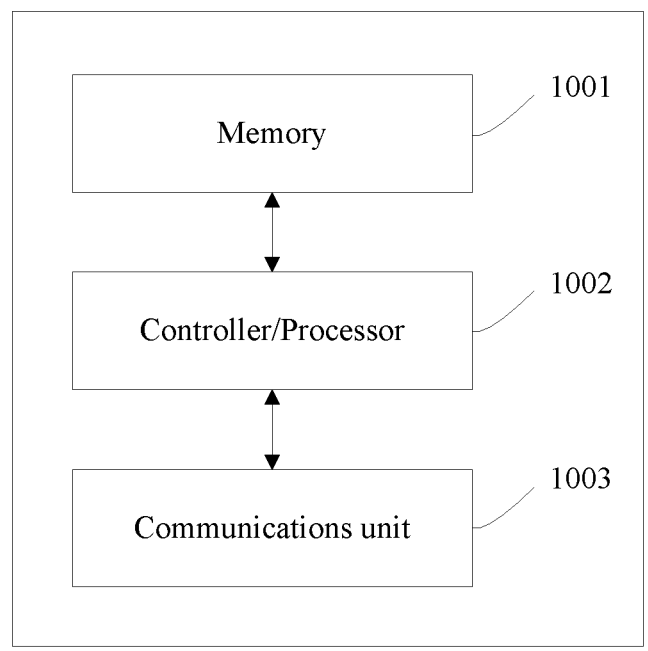
FIG. 10 is a schematic structural diagram of a core network device according to an embodiment of the present invention.

FIG. 10 shows a block diagram of a design of a core network device in the foregoing embodiment.

The core network device includes: a controller/processor 1002, configured to control and manage an action of the core network device, and perform various functions to support a communication service of a terminal; a memory 1001, configured to store program code and data for the core network device; and a communications unit 1003, configured to support communication between the core network device and another network entity, for example, communication between the core network device and the communications unit 904 of the access network device in FIG. 9, and/or communication between the core network device and the terminal in FIG. 8. It may be understood that the controller/processor 1002 controls the communications unit 1003, so that the core network device can perform actions performed by the core network device in FIG. 3 to FIG. 7.

A person skilled in the art may further understand that various illustrative logical blocks and steps that are listed in the embodiments of the present invention may be implemented by using electronic hardware, computer software, or a combination thereof. In order to clearly display the interchangeability between the hardware and the software, functions of the foregoing various illustrative components and steps have been generally described. Whether the functions are implemented by using hardware or software depends on particular applications and design requirements of the entire system. A person skilled in the art may use various methods to implement the described functions for each particular application, but it should not be understood that the implementation goes beyond the protection scope of the embodiments of present invention.

The various illustrative logical blocks, modules, and circuits described in the embodiments of the present invention may implement or operate the described functions by using a general processing unit, a digital signal processing unit, an application-specific integrated circuit (ASIC), a field programmable gate array (FPGA) or another programmable logical apparatus, a discrete gate or transistor logic, a discrete hardware component, or a design of any combination thereof. The general processing unit may be a microprocessing unit. Optionally, the general processing unit may be any conventional processing unit, controller, microcontroller, or state machine. The processing unit may be implemented by using a combination of computing apparatuses, such as a digital signal processing unit and a microprocessing unit, a plurality of microprocessing units, one or more microprocessing units with a digital signal processing unit core, or any other similar configuration.

Steps of the methods or algorithms described in the embodiments of the present invention may be directly embedded into hardware, a software module executed by a processing unit, or a combination thereof. The software module may be stored in a RAM memory, a flash memory, a ROM memory, an EPROM memory, an EEPROM memory, a register, a hard disk, a removable magnetic disk, a CD-ROM, or a storage medium in any other form in the art. For example, the storage medium may connect to a processing unit, so that the processing unit may read information from the storage medium and write information to the storage medium. Optionally, the storage medium may be further integrated into a processing unit. The processing unit and the storage medium may be arranged in an ASIC, and the ASIC may be arranged in a user terminal. Optionally, the processing unit and the storage medium may be arranged in different components of the user terminal.

In one or more example designs, the functions described in the embodiments of the present invention may be implemented by using hardware, software, firmware, or any combination thereof. If the present invention is implemented by software, these functions may be stored in a computer-readable medium or are transmitted to the computer-readable medium in a form of one or more instructions or code. The computer-readable medium is either a computer storage medium or a communications medium that enables a computer program to move from one place to another. The storage medium may be an available medium that can be accessed by any general or special computer. For example, such a computer-readable medium may include but is not limited to a RAM, a ROM, an EEPROM, a CD-ROM, or another optical disc storage, a disk storage or another magnetic storage apparatus, or any other medium that may be used to bear or store program code, where the program code is in a form of an instruction or a data structure or in a form that can be read by a general or special computer or a general or special processing unit. In addition, any connection may be appropriately defined as a computer-readable medium. For example, if software is transmitted from a website, a server, or another remote resource by using a coaxial cable, an optical fiber, a twisted pair, a digital subscriber line (DSL) or in a wireless manner, such as infrared, radio, or microwave, the software is included in a defined computer-readable medium. The disc (disc) and the disk (disk) include a compressed disk, a laser disk, an optical disc, a DVD, a floppy disk, and a Blu-ray disc. The disk generally copies data by a magnetic means, and the disc generally copies data optically by a laser means. The foregoing combination may also be included in the computer-readable medium.

According to the foregoing description of this specification in the present invention, technologies in the art may use or implement the content of the present invention. Any modification based on the disclosed content shall be considered obvious in the art. The basic principles described in the present invention may be applied to other variations without departing from the essence and scope of the present invention. Therefore, the content disclosed in the present invention is not limited to the described embodiments and designs but may also be extended to a maximum scope that is consistent with the principles and disclosed new features of the present invention.

What is claimed is:

1. A terminal, comprising:
    a processor, configured to obtain information about a current coverage class of the terminal when the terminal is disconnected from a network; and
    a transmitter, in communication with the processor and configured to send a first message to an access network device of the network, wherein the first message carries information about a coverage class of the terminal, and the information about the coverage class of the terminal comprises at least one of the following information:
        information indicating a change to the coverage class of the terminal, or
        the information about the current coverage class of the terminal,
    wherein a second message is sent by the access network device to a core network device that carries information indicating a change to the coverage class of the terminal or the information about the current coverage class of the terminal, wherein, after sending the second message to the core network device, a connection to the terminal device is released or deactivated according to an indication of the core network device and a third message is sent to the core network device, wherein the third message carries the information about the current coverage class of the terminal.

2. The terminal according to claim 1, wherein that the first message carries the information about the current coverage class of the terminal comprises:
    carrying the information about the current coverage class of the terminal in an information element or a field in the first message; or
    implicitly indicating the information about the current coverage class of the terminal by using a bearer resource of the first message.

3. The terminal according to claim 1, wherein the information about the current coverage class of the terminal comprises one of the following information or a combination thereof:
    a coverage class report,
    a transmit power of the access network device,
    a coverage class,
    a coverage class index, or
    a coverage radius.

4. The terminal according to claim 1, wherein the first message is one of the following messages: a random access request message, a radio resource control connection setup complete message, a radio resource control connection resume request message, or a radio resource control connection setup request message.

5. The terminal according to claim 1, wherein the transmitter is further configured to send the first message within a predetermined time that is before the terminal responds to network paging.

6. A method to transmit information, comprising:
    receiving, by an access network device of a network, a first message sent by a terminal in communication with the network, wherein the first message carries information about a coverage class of the terminal, and the information about the coverage class of the terminal comprises at least one of the following information:
        information indicating a change to the coverage class of the terminal, or information about a current coverage class of the terminal; and sending, by the access network device, a second message to a core network device of the network, wherein
the second message carries the information about the coverage class of the terminal, or
the second message carries the information indicating the change to the coverage class of the terminal or the information about the current coverage class of the terminal in the information about the coverage class of the terminal, wherein after sending the second message to the core network device, releasing or deactivating a connection to the terminal according to an indication of the core network device, and sending a third message to the core network device, wherein the third message carries the information about the current coverage class of the terminal.

7. The method according to claim 6, wherein the information indicating that the coverage class has changed is carried in an indication information element in the second message.

8. The method according to claim 6, wherein the information about the current coverage class of the terminal may comprise one of the following information or a combination thereof: a coverage class report, a transmit power of the access network device, a coverage class, a coverage class index, or a coverage radius.

9. The method according to claim 6, comprising: when the core network device determines, within a predetermined time that is after the core network device receives the second message, that there is to-be-sent downlink data, initiating, by the core network device, setup of a transmission channel, and sending the downlink data to the terminal.

10. The method according to claim 6, comprising: when the core network device determines, within a predetermined time that is after the core network device receives the second message, that there is to-be-sent downlink data, sending, by the core network device, the downlink data to the access network device by using non-access stratum signaling.

11. The method according to claim 6, wherein after the sending, by the access network device, a second message to a core network device, the access network device initiates a first timer, wherein an expiration moment of the first timer is the same as an expiration moment of a timer of the terminal and an expiration time of a timer of the core network device; and when the first timer expires, the access network device releases or deactivates the connection to the terminal, and releases or deactivates a connection to the core network device.

12. An access network device, comprising:
a receiver, configured to receive a first message sent by a terminal, wherein the first message carries information about a coverage class of the terminal, and the information about the coverage class of the terminal comprises at least one of the following information:
information indicating a change to the coverage class of the terminal, or
information about a current coverage class of the terminal; and
a transmitter, configured to send a second message to a core network device, wherein
the second message carries the information about the coverage class of the terminal, or
the second message carries the information indicating the change to the coverage class of the terminal or the information about the current coverage class of the terminal in the information about the coverage class of the terminal, wherein after sending the second message to the core network device, releasing or deactivating a connection to the terminal according to an indication of the core network device, and sending a third message to the core network device, wherein the third message carries the information about the current coverage class of the terminal.

13. The access network device according to claim 12, wherein the information indicating that the coverage class has changed is carried in an indication information element in the second message.

14. The access network device according to claim 12, wherein the information about the current coverage class of the terminal may comprise one of the following information or a combination thereof: a coverage class report, a transmit power of the access network device, a coverage class, a coverage class index, or a coverage radius.

* * * * *